United States Patent
Vetter et al.

(10) Patent No.: US 6,772,602 B2
(45) Date of Patent: Aug. 10, 2004

(54) COOLING SYSTEM FOR A VEHICLE

(75) Inventors: Frank Vetter, Filderstadt (DE); Mark Reichler, Stuttgart (DE); Daniela Welchler, Zell (DE)

(73) Assignee: Modine Manufacturing Company, Racine, WI (US)

( * ) Notice: Subject to any disclaimer, the term of this patent is extended or adjusted under 35 U.S.C. 154(b) by 0 days.

(21) Appl. No.: 10/207,633

(22) Filed: Jul. 29, 2002

(65) Prior Publication Data

US 2003/0041617 A1 Mar. 6, 2003

(30) Foreign Application Priority Data

Aug. 2, 2001 (DE) .......................................... 101 37 907

(51) Int. Cl.[7] .................................................. B60H 1/32
(52) U.S. Cl. ............................. 62/239; 62/244; 62/241; 62/61
(58) Field of Search .......................... 62/428, 507, 239, 62/244, 241, 61

(56) References Cited

U.S. PATENT DOCUMENTS 3,479,834 A   11/1969   Anglin et al.
3,606,762 A * 9/1971   Anglin et al. ................. 62/241

FOREIGN PATENT DOCUMENTS

| DE | 198 43 928 A1 | 1/1999 |
|----|---------------|--------|
| DE | 198 30 757 A1 | 1/2000 |
| DE | 199 18 617 A1 | 11/2000 |
| EP | 0 583 851 B1  | 1/1994 |
| EP | 0 678 661 A1  | 10/1995 |
| EP | 1 046 524 A2  | 10/2000 |
| EP | 1 068 967 A1  | 1/2001 |

* cited by examiner

*Primary Examiner*—Chen Wen Jiang
(74) *Attorney, Agent, or Firm*—Wood, Phillips, Katz, Clark & Mortimer

(57) ABSTRACT

A cooling system is provided for a vehicle that includes an air-cooled coolant radiator and air-cooled gas cooler to cool a gas flow of a $CO_2$ type air conditioning system of the vehicle. The cooling system includes a pre-cooler for pre-cooling of the refrigerant by transferring heat from the refrigerant either to the coolant flowing through the radiator or to a cooling air flow passing through the radiator, or both.

16 Claims, 3 Drawing Sheets

COOLING SYSTEM FOR A VEHICLE

FIELD OF THE INVENTION

This invention relates to cooling systems for vehicles, and more particularly, to vehicular cooling systems that include a coolant system for an engine coolant of the vehicle and a carbon dioxide ($CO_2$) type air conditioning system.

RELATED APPLICATIONS

This application claims priority to German application DE 101 37 907.2, filed Aug. 2, 2001, the entire contents of which are incorporated herein by reference 7.

BACKGROUND OF THE INVENTION

Vehicular cooling systems that include a coolant system for an engine coolant of the vehicle and a transcritical or $CO_2$ type refrigeration or air conditioning system are know. Typically, the cooling system will include a coolant heat exchanger or radiator, and the $CO_2$ type air conditioning system will include an air conditioning loop consisting of at least a compressor, a gas cooler, an expansion valve, and an evaporator, all connected in series by in-flow and out-flow conduits for the refrigerant, which would typically be $CO_2$. in such air conditioning systems, the refrigerant will typically enter the gas cooler with a temperature of about 150° C. and will be cooled to about ambient temperature by a cooling air flow.

It is also known to provide an intermediate heat exchanger in the form of a so called suction line heat exchanger in $CO_2$ type air conditioning systems to transfer heat from the high temperature refrigerant on the high pressure side of the air conditioning system to the low temperature refrigerant on the low pressure side of the system, which will typically at least partially contain a liquid phase. However, because of their function, these types of heat exchangers are arranged on the high pressure side of the system downstream of the gas cooler.

A relatively high inlet temperature of the refrigerant in combination with the high pressures that prevail in $CO_2$ type systems, can cause significant material stresses in the gas cooler, which is typically fabricated of aluminum sheet. This will typically require larger thicknesses for the aluminum sheet and a more pressure-stabile configuration, both of which are cost factors.

One possible solution to the high stresses is to operate the $CO_2$ type air conditioning unit at a lower temperature level. However, operation of such systems at a lower level can lead to inadequate cooling performance or, if inadequate cooling performance is unacceptable, the heat exchangers for the air conditioning system having larger and more efficient heat exchange surfaces, which is typically out of the question for vehicle manufactures who are tending to require increasingly smaller design space for such systems.

Another concern for such systems is that the air conditioning system typically posses a partially unsatisfactory output in the limited load range, and in particular with the many idle phases of the vehicle because the compressor, driven by the motor in such idle phases, can only furnish a relatively limited mass flow of refrigerant.

SUMMARY OF THE INVENTION

It is the primary object of the invention to provide a new and improved cooling system for a vehicle that includes a $CO_2$ type air conditioning system and a coolant system for an engine coolant for the vehicle.

In one form of the invention, a cooling system is provided for a vehicle that includes an air cooled coolant radiator to cool a coolant flow of the vehicle and an air cooled gas cooler to cool a gas flow of a $CO_2$ type air conditioning system of the vehicle. The radiator includes a plurality of coolant tubes to direct the coolant flow through the radiator, and spaces between the coolant tubes to direct a cooling air flow through the radiator. The gas cooler is positioned upstream in an cooling air flow direction with respect to the radiator. The system further includes a gas pre-cooler in heat-conducting contact with at least one of the coolant flow through the radiator and the cooling air flow to allow the gas flow to be cooled thereby.

In one form, the pre-cooler includes an inlet gas conduit connected to the gas cooler to direct the gas flow thereto from the pre-cooler. The inlet gas conduit is positioned downstream of the radiator in the cooling air flow direction to be cooled by the cooling air flow exiting the radiator.

In one form, at least part of the pre-cooler is located in a coolant collecting tank of the radiator to be cooled by the coolant flow in the collecting tank.

In one form, the coolant system further includes an expansion vessel for the coolant flow, and at least part of the pre-cooler is located in the expansion vessel to be cooled by the coolant flow in the expansion vessel.

In one form, the gas cooler includes at least one tube, and the pre-cooler includes at least a portion of the at least one tube extending along and in heat-conducting contact with at least one of the coolant tubes of the radiator. According to one form, the cooling system further includes an air-side fin contacting both the portion of the at least one tube and the at least one of the coolant tubes of the radiator.

In form of the invention, the coolant system is provided for a vehicle and includes an air-cooled coolant radiator to cool a coolant flow of the vehicle, and an air-cooled gas cooler to cool a gas flow of $CO_2$ type air conditioning system of the vehicle. The radiator includes a plurality of coolant tubes to direct the coolant flow through the radiator, and spaces between the coolant tubes to direct a cooling air flow through the radiator. The gas cooler includes an inlet manifold. The system further includes an inlet gas conduit connected to the inlet manifold to direct the gas flow thereto. The inlet gas conduit is positioned downstream of the radiator in the cooling air flow direction to be cooled by the cooling air flow exiting the radiator.

In accordance with one form of the invention, a cooling system is provided for a vehicle and includes an air-cooled coolant radiator to cool a coolant flow of the vehicle, and an air-cooled gas cooler to cool a gas flow of a $CO_2$ type air conditioning system of a vehicle. The radiator includes a coolant collecting tank, and the gas cooler includes an inlet manifold. The cooling system further includes a heat exchanger connected to the inlet manifold to direct the gas flow thereto. The heat exchanger is located in the coolant collecting tank to be cooled by the coolant flow.

In one form of the invention, a cooling system is provided for a vehicle and includes an expansion vessel for a cooling system of the vehicle, and air-cooled coolant radiator for the coolant system of the vehicle, and an air cooled gas cooler to cool a gas flow of a $CO_2$ type air conditioning system of the vehicle. The gas cooler includes an inlet manifold. The system further includes a heat exchanger connected to the inlet manifold to direct the gas flow thereto. The heat exchanger is located in the expansion vessel to be cooled by coolant in the expansion vessel.

In accordance with of one form of the invention, a cooling system is provided for a vehicle and includes an air-cooled coolant radiator to cool a coolant flow of the vehicle, and an air-cooled gas cooler to cool a gas flow of a $CO_2$ type air conditioning system of the vehicle. The radiator includes a plurality of coolant tubes to direct the coolant flow through the radiator, and spaces between the coolant tubes to direct a cooling air flow through the radiator. The gas cooler is positioned upstream in a cooling air flow direction with respect to the radiator, and includes a inlet manifold and at least one tube. At least a portion of the at least one tube extends along and is in heat-conducting contact with at least one of the coolant tubes of the radiator.

In one form of the invention, a method is provided for cooling a gas flow of a $CO_2$ type air conditioning system in a vehicle including an air-cooled gas cooler to cool the gas flow and an air-cooled coolant radiator to cool a coolant flow of the vehicle by transferring heat to a cooling air flow passing through the radiator. The method includes the steps of pre-cooling the gas flow by transferring heat to at least one of the coolant flow and the cooling air flow, and after the pre-cooling step, cooling the gas flow in the gas cooler by transferring heat from the gas flow to the cooling air flow.

Other objects, advantages, aspects, and forms of the invention will be realized by reviewing the entire specification, including the appended claims and drawings.

DETAILED DESCRIPTION OF THE PREFERRED EMBODIMENTS

Figure 1:
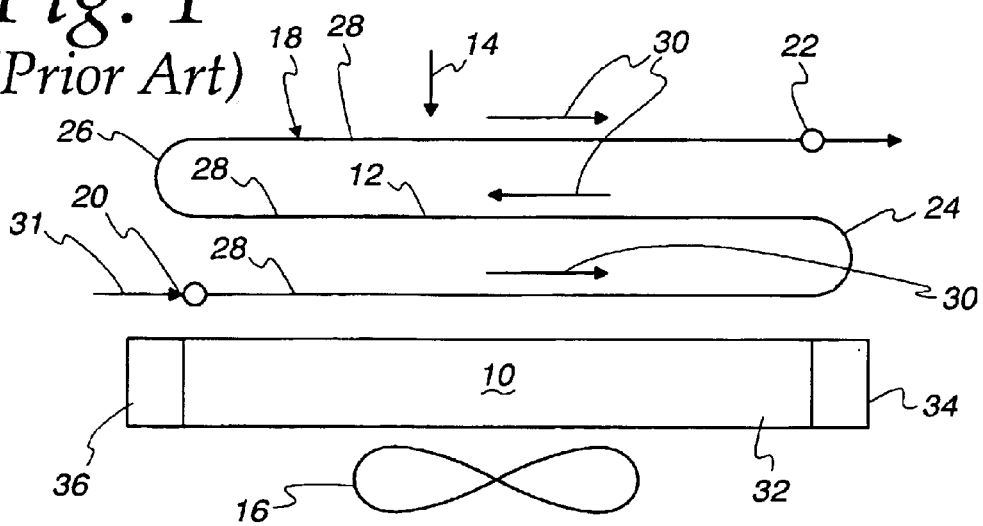
FIG. 1 is a somewhat diagrammatic representation of a prior art cooling system, as viewed from above.
Figure 2:
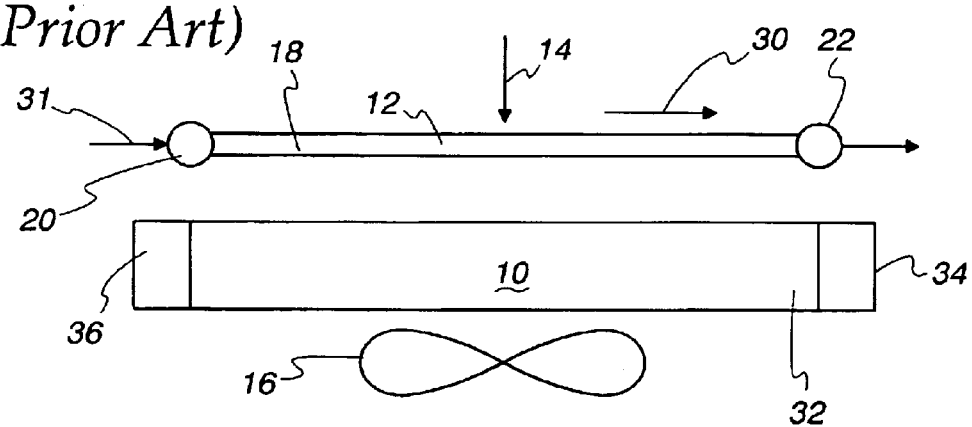
FIG. 2 is a somewhat diagrammatic representation of another prior art cooling system as viewed from above.

FIGS. 1 and 2 show examples of conventional cooling system constructions wherein a coolant radiator 10 and a $CO_2$ gas cooler 12 lie in a engine compartment of a vehicle (now shown), with the gas cooler 12 located upstream in the cooling air flow direction shown by the arrow 14. The cooling air flow 14 is typically conveyed through the radiator 10 and the gas cooler 12 by an intake fan 16, as well as forward motion of the vehicle, in order to cool the vapor phase $CO_2$ in the gas cooler 12, and the engine coolant in the radiator 10. The radiator 10 and the gas cooler 12 can be connected releasably or non-releasably to each other in a manner not shown because it is adequately known and not essential in the present context.

As seen in FIG. 1, the gas cooler 12 includes a plurality of flat, multi-port tubes (only the top most tube depicted in FIGS. 1 and 2) extending between cylindrical intake manifold 20 and a cylindrical outlet manifold 22. The tubes 18 are spaced along the axes of the manifolds 20 and 22 so that each of the tubes lies in a plane that is parallel to the cooling air flow 14. In the illustrated embodiments, each of the tubes 18 includes two hairpin bends 24 and 26 so that there are three parallel tube runs 28 that extends perpendicular to the cooling air flow 14 in the plane of the tube to provide a cross-counter flow relationship with the cooling air flow 14, as shown by the arrows 30 which indicate the flow of the $CO_2$ through each of the tubes 18. Ideally, the temperature of the $CO_2$ at the outlet should lie at about the ambient temperature of the air. An inflow line 31 is provided for directing the $CO_2$ into the inlet manifold 20 and is typically laid out as required for incorporation into the engine compartment of the particular vehicle in which the cooling system is installed. FIG. 2 shows an arrangement similar to that shown in FIG. 1, except that the gas cooler 12 is provided in a parallel flow type construction in which the flat tubes 18 are straight, without the hair pin bends 24 and 26 of the example shown in FIG. 1. This provides a cross flow arrangement for refrigerant flow (shown by arrow 30) with respect to the cooling air flow 14. This design is similar to one described in EP 583 851 B1, belonging to the assignee of the present application, for a condenser, which is arranged in a conventional air conditioning loop. EP 583 851 B1 corresponds to U.S. Pat. No. 4,998,580 issued Mar. 12, 1991 to the assignee of the present invention. The disclosures of both these patent documents are incorporated herein by reference and should be referred to for additional details concerning the design of a suitable parallel flow type gas coolers. It is also known in parallel type flow constructions to include partitions arranged at different levels in the manifolds 20 and 22 to separate the tubes 18 into groups that are traversed in a coiled-like fashion by the carbon dioxide as it passes through the gas cooler 12. It should be understood that the manifolds 20 and 22 can be arranged on the same side of the gas cooler 12 providing an odd number of the bends 24, 26 in the tubes 18. The coolant radiator 10 includes a plurality of flattened tubes 32 (only the topmost tube depicted in FIGS. 1 and 2) extending between a pair of collecting tanks 34 and 36. The tubes 32 are spaced along the axes of the tanks 34 and 36 so that each of the tubes lies in a plane that is parallel to the cooling air flow 14. Typically the tubes 32 will be multi-port.

It will be appreciated by those skilled in the art that in FIGS. 1 and 2, as well as the remaining figures of this specification, the broad sides of each flat tube 18 and 32 lie in the plane of the paper, parallel to the air-flow 14, and that the narrow sides of the tubes 18 and 32 extend in planes perpendicular to the plane of the paper and to the cooling air flow 14. It should also be appreciated that the tubes 18 and 32 are stacked in alteration with corrugated or serpentine fins (not shown) in the direction perpendicular to the plane of the paper. From the prior art shown in FIGS. 1 and 2, it can be seen that there is no deliberate heat exchange relation between the radiator 10 and the gas cooler 12 that is directed towards achieving an advantage.

In a typical arrangement, as shown in FIGS. 1 and 2 and the remaining figures of the specification, the flat tubes 18, 32 are arranged horizontally, and the manifolds 20 and 22 and the collecting tanks 34, 36 are arranged vertically in the vehicle.

Figure 3:
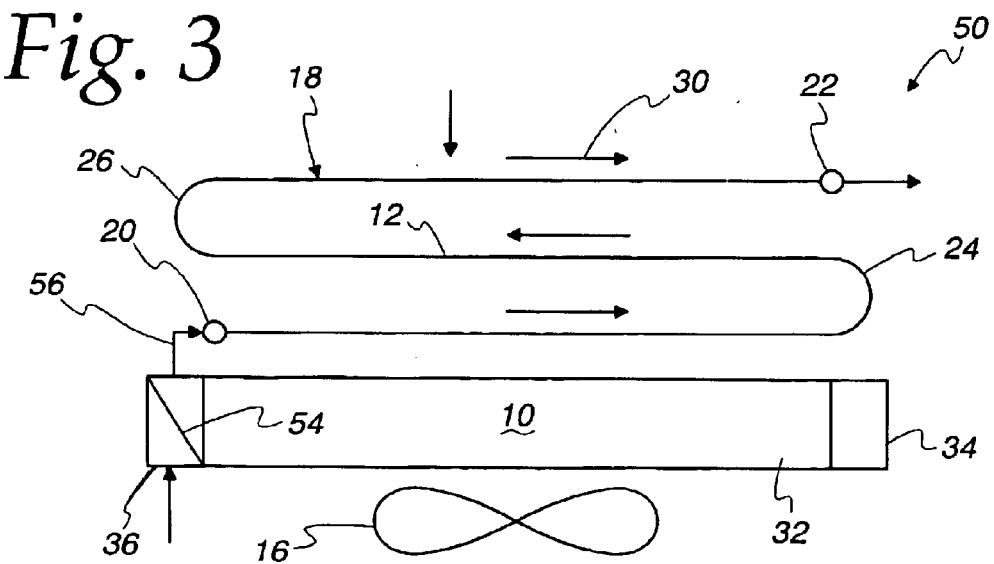
FIGS. 3–8 are somewhat diagrammatic representations, viewed from above, of several different configurations of cooling systems embodying the invention.

FIG. 3 shows a cooling system 50 embodying the invention with a coolant radiator 10 and gas cooler 12 of the same construction as that shown in FIG. 1. Additionally, a pre-cooler heat exchanger, shown schematically at 54, is located in one of the collecting tanks 34, 36 of the radiator 10, preferably in the outlet collecting tank 36 of the radiator 10. The refrigerant, preferably $CO_2$, flows through the pre-cooler 54 and transfers heat from the refrigerant to the coolant in the collecting tank 36 of the radiator 10 before being directed to the gas cooler 12 by an inlet line or conduit 56. This embodiment of the cooling system 50 is perhaps the best from the stand point of efficient heat exchange. As discussed in the background section, it is known to incorporate heat exchangers inside the collecting tanks of radiators, and there are many such forms for these known heat exchangers that may be used for the construction of the heat exchanger 54. For example, the heat exchanger 54 can be of similar construction to the heat exchanger in EP 678

661 B1 belonging to the assignee of the present application, which is a coolant-cooled condenser arranged in the collecting tank of a radiator.

Figure 4:
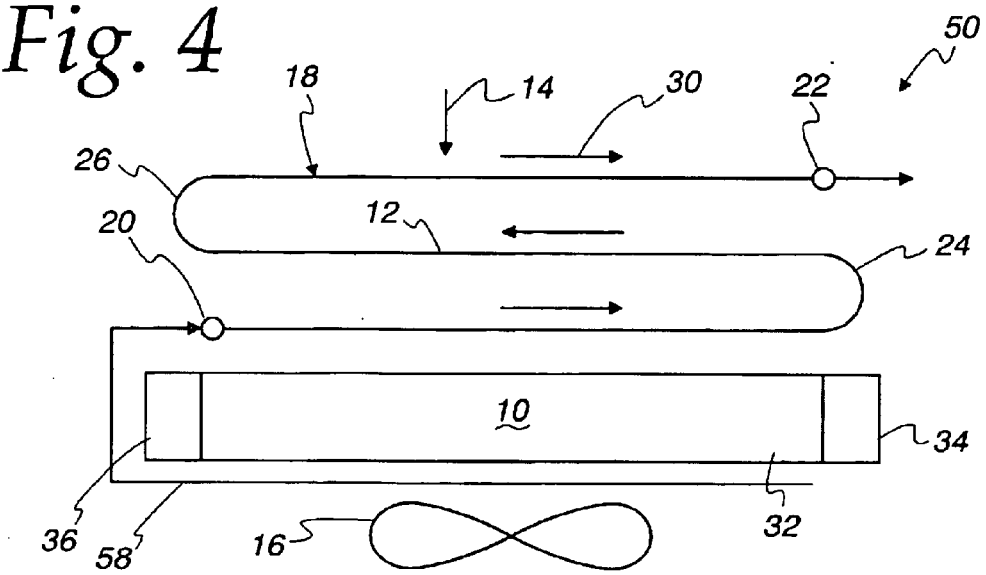

FIG. 4 shows another embodiment of the cooling system 50, again incorporating a radiator 10 and a gas cooler 12 of the same construction as shown in FIG. 1. In this embodiment, a refrigerant inlet line or conduit 58 has been located on the downstream side of the radiator 10, preferably extending over the entire length of the tubes 32 of the radiator 10. The refrigerant is pre-cooled by the cooling air flow 14 after it passes through the radiator 10. To improve heat transfer, the inlet conduit 58 can be provided with air-side fins.

Figure 5:
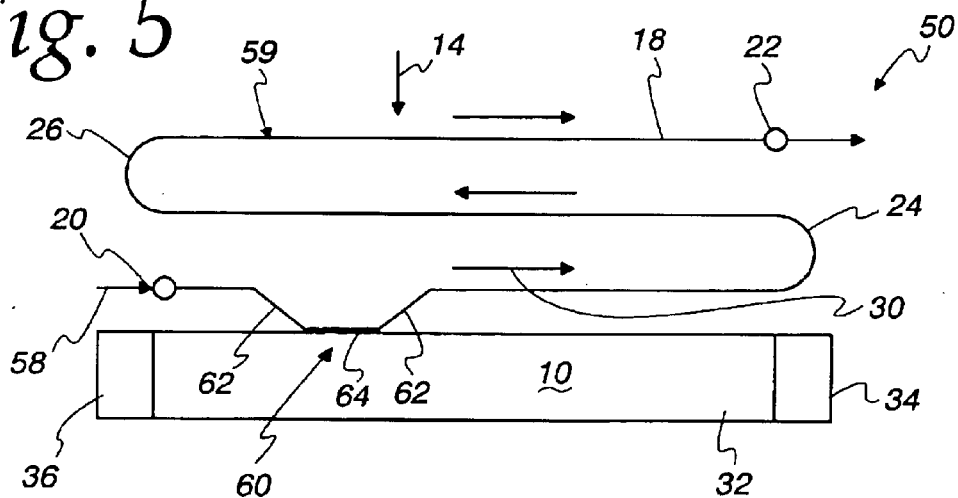

FIG. 5 shows yet another embodiment of the cooling system 50 incorporating a radiator 10 of the same construction as shown in FIG. 1 and a modified version 59 of the gas cooler 12 shown in FIG. 1. More specifically, a pre-cooler section 60 has been provided in the initial length of at least one of the tubes 18 of the gas cooler 59 by placing bends 62 in the tube 18 so that a longitudinal length 64 of the tube 26 can be placed in heat conducting contact with one of the tubes 32 of the radiator 10. As seen, the length 64 lies against the tube 32 for good heat conduction. Additionally, corrugated or serpentine fins (not shown) can enclose and extend over the section 64 and the corresponding length of the tube 32 of the radiator 10 in order to further promote the intensity of heat exchange. In one practical example that is not shown, the top three tubes 18 of the gas cooler 52 are connected in the above described manner to the tubes 32 of the radiator 10. In another variation that is not shown, the inlet conduit 58 can be placed in heat-conducting contact with one of the tubes 32 of the radiator 10.

Although not shown in an additional figure, it will be understood by those skilled in the art from FIGS. 3–5 that the various embodiments depicted therein can be arbitrally combined into one cooling system 50 in order to achieve a desired reduction in the inlet temperature of the refrigerant. For example, the embodiments of FIGS. 3 and 4 can be combined such that the inlet conduit 58 directs the refrigerant flow into the heat exchanger 54 before the refrigerant is directed into the inlet manifold 20 by the conduit 56.

Figure 6:
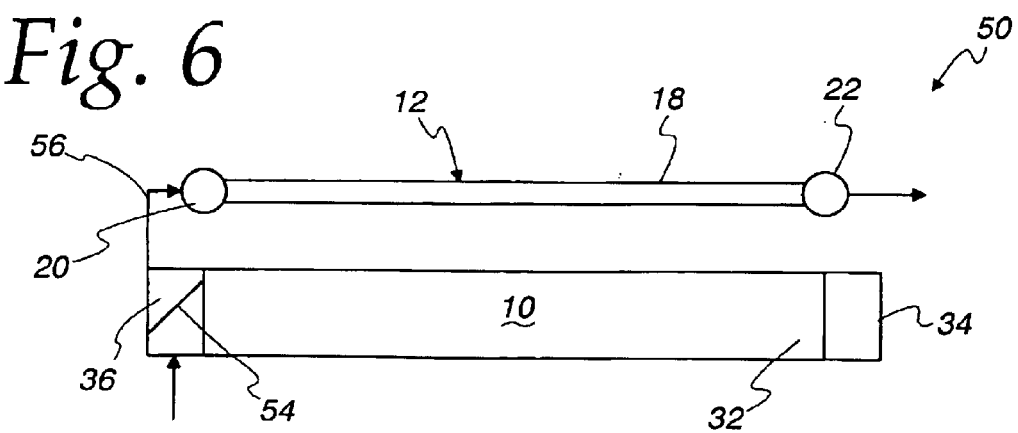
Figure 7:
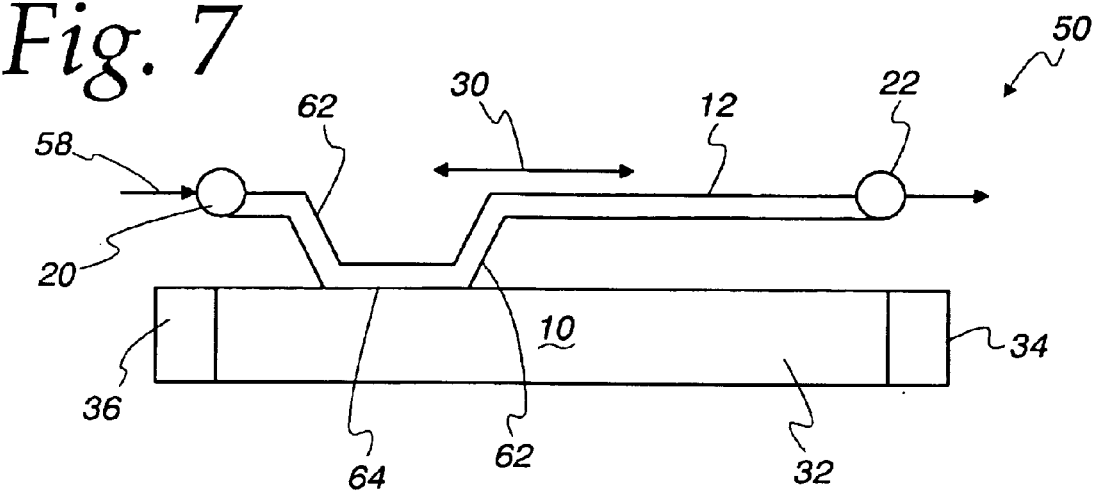

FIG. 6 shows an embodiment 50 similar to that shown in FIG. 3, but in which the gas cooler 12 is provided in a parallel flow construction such as shown in FIG. 2 rather than the cross-counterflow construction shown in FIG. 1. Similarly, FIG. 7 shows a cooling system 50 similar to the cooling system 50 shown in FIG. 5, but using a parallel flow type gas cooler construction 12 similar to that shown in FIGS. 2 and 6. Again, in the parallel flow construction of the gas cooler 12, the manifolds 20 and 22 can be designed to provide a multi-passing of the refrigerant so that it makes at least two passes through two different banks or groups of the tubes 26. This is illustrated as an example in FIG. 7 by the double arrow 30, which is intended to indicate that there are groups of the multi-chambered tubes 18 in which the coolant flows from left to right, for example, in one group, and from right to left, in the next adjacent group of the tubes 18 arranged above or below the first mentioned group.

Figure 8:
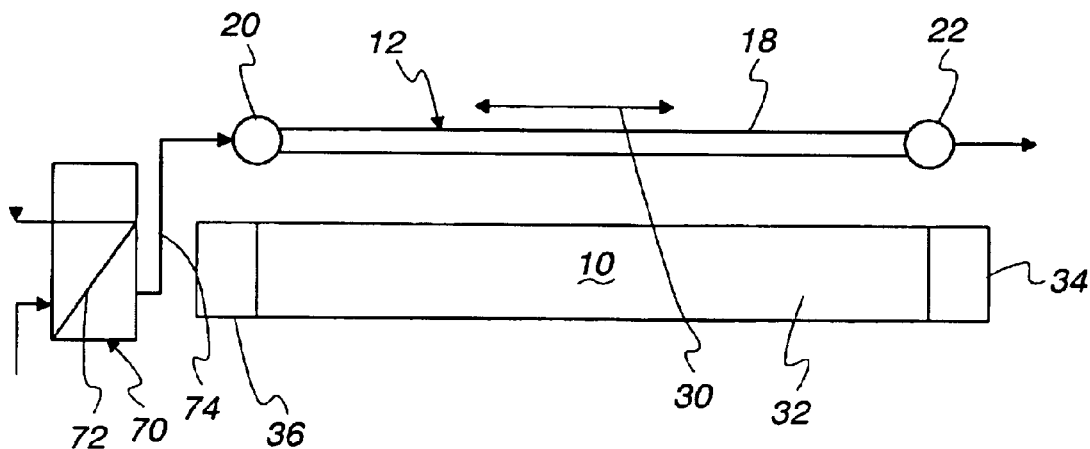

Finally, FIG. 8 shows another embodiment of the cooling system 50 that can be very effective. In this embodiment, an expansion vessel 70 is provided for the coolant flowing through the radiator 10 and the cooling system of the vehicle and is preferably located in the immediate vicinity of the radiator 10 and the gas cooler 12. A pre-cooler heat exchanger, shown schematically at 72, is located within the expansion vessel 70 to transfer heat from the refrigerant to the coolant within the expansion vessel prior to the refrigerant being directed to the gas cooler 12 by a conduit or line 74. Again, because there are many possible variations for the pre-cooler heat exchanger 72, further details will not be given herein. It should also be understood that while a parallel flow type gas cooler 12 similar to that shown in FIG. 2 is shown in FIG. 8, a gas cooler 12 having the construction shown in FIG. 1 may also be used with the pre-cooler 72 and of the expansion tank 70.

Although not shown in an additional figure, it will be understood by those skilled in the art from FIGS. 6–8 that the various embodiments depicted therein can be arbitrarily combined into one cooling system 50 in order to achieve a desired reduction in the inlet temperature of the refrigerant.

In summary, various embodiments of the cooling system 50 provide for pre-cooling of the refrigerant by transferring heat from the refrigerant either to the coolant flowing through the radiator 10 or to the cooling air flow 14 passing through the radiator 10, or both. The cooling system 50 exploits the fact that the temperature of the engine coolant will typically lie well below the temperature of the refrigerant being directed to the gas cooler 12 in $CO_2$ type air conditioning systems. Because of this, in practical examples, the inlet temperature of the refrigerant can be reduced from about 150° C. to roughly the temperature of the coolant. Thus, the material stresses caused by the high temperature differences between the cooling air and the refrigerant, which often lead to problems that manifest themselves in cracks or brakes, are at least partially reduced. By providing such pre-cooling, the gas cooler 12 can be designed without having as much concern for high temperatures and the potential stresses that are caused by such high temperatures. In other terms, the gas cooler can be designed for maximum operating pressures, with alternating temperature load only playing a subordinate or at least a limited role. Furthermore, by pre-cooling the refrigerant, the cooling air flow 14 passing through the gas cooler 12 does not loose as much of its cooling capacity in comparison to more conventional cooling systems, and, accordingly, the cooling air flow 14 has a lower temperature on encountering the radiator 10 than it would have without pre-cooling of the refrigerant and can impart greater efficiency in the heat exchange between the coolant and the cooling airflow 14 in the radiator 10.

The cooling system 50 can be particularly effective in the low load range of the vehicle engine and in its starting phases, because, the engine must initially run hot (without cooling) in order to operate efficiently and environmentally safely, even at high outside temperatures. By pre-cooling the refrigerant with the relatively cool engine coolant, the air conditioning system of the vehicle can more quickly carry out its cooling effect and the coolant, together with the engine, can be heated more rapidly.

What is claimed is:

1. A cooling system for a vehicle comprising:
   an air-cooled coolant radiator to cool a coolant flow of the vehicle, the radiator including a plurality of coolant tubes to direct the coolant flow through the radiator, and spaces between the coolant tubes to direct a cooling air flow through the radiator;
   an air-cooled gas cooler to coolant gas flow of a $CO_2$ type air condition system of the vehicle, the gas cooler positioned upstream in a cooling air flow direction with respect to the radiator; and
   a gas pre-cooler in heat-conducting contact with the coolant flow through the radiator to allow the gas flow to be cooled thereby.

2. The cooling system of claim 1 wherein the gas cooler comprises a plurality of tubes extending between a pair of gas manifolds to direct the gas flow between the gas manifolds in a cross-flow relationship with the cooling air flow.

3. The cooling system of claim 1 wherein the gas cooler comprises a plurality of flat, multi-port tubes, each tube including at least one bend connecting a pair of parallel tube runs and extending between a pair of gas manifolds to direct the gas flow between the gas manifolds in a cross-counter flow relationship with the cooling air flow.

4. A cooling system for a vehicle comprising:
an air-cooled coolant radiator to cool a coolant flow of the vehicle, the radiator including a plurality of coolant tubes to direct the coolant flow through the radiator, and spaces between the coolant tubes to direct a cooling air flow through the radiator;
an air-cooled gas cooler to cool a gas flow of a $CO_2$ type air condition system of the vehicle, the gas cooler positioned upstream in a cooling air flow direction with respect to the radiator;
a gas pre-cooler in heat-conducting contact with at least one of the coolant flow through the radiator and the cooling air flow to allow the gas flow to be cooled thereby; and
wherein the pre-cooler comprises an inlet gas conduit connected to the gas cooler to direct the gas flow thereto from the pre-cooler, the inlet gas conduit positioned downstream of the radiator in the cooling air flow direction to be cooled by the cooling air flow exiting the radiator.

5. The cooling system of claim 4 wherein the pre-cooler further comprises at least one air-side fin on the inlet gas conduit.

6. A cooling system for a vehicle comprising:
an air-cooled coolant radiator to cool a coolant flow of the vehicle, the radiator including a plurality of coolant tubes to direct the coolant flow through the radiator, and spaces between the coolant tubes to direct a cooling air flow through the radiator;
an air-cooled gas cooler to cool a gas flow of a $CO_2$ type air condition system of the vehicle, the gas cooler positioned upstream in a cooling air flow direction with respect to the radiator;
a gas pre-cooler in heat-conducting contact with at least one of the coolant flow through the radiator and the cooling air flow to allow the gas flow to be cooled thereby; and
wherein at least part of the pre-cooler is located in a coolant collecting tank of the radiator to be cooled by the coolant flow in the collecting tank.

7. A cooling system for a vehicle comprising:
an air-cooled coolant radiator to cool a coolant flow of the vehicle, the radiator including a plurality of coolant tubes to direct the coolant flow through the radiator, and spaces between the coolant tubes to direct a cooling air flow through the radiator;
an air-cooled gas cooler to cool a gas flow of a $CO_2$ type air condition system of the vehicle, the gas cooler positioned upstream in a cooling air flow direction with respect to the radiator;
a gas pre-cooler in heat-conducting contact with at least one of the coolant flow through the radiator and the cooling air flow to allow the gas flow to be cooler thereby; and
wherein the cooling system further comprises an expansion vessel for the coolant flow and at least part o the pre-cooler is located in the expansion vessel to be cooled by the coolant flow in the expansion vessel.

8. A cooling system for a vehicle comprising:
an air-cooled coolant radiator to cool a coolant flow of the vehicle, the radiator including a plurality of coolant tubes to direct the coolant flow through the radiator, and spaces between the coolant tubes to direct a cooling air flow through the radiator;
an air-cooled gas cooler to cool a gas flow of a $CO_2$ type air condition system of the vehicle, the gas cooler positioned upstream in a cooling air flow direction with respect to the radiator;
a gas pre-cooler in heat-conducting contact with at least one of the coolant flow through the radiator and the cooling air flow to allow the gas flow to be cooled thereby; and
wherein the gas cooler comprises at least one tube and the pre-cooler comprises at least a portion of the at least one tube extending along and in heat-conducting contact with at least of one of the coolant tubes of the radiator.

9. The cooling system of claim 8 further comprising an air-side fin contacting both the portion of the at least one tube and the at least one of the coolant tubes of the radiator.

10. A cooling system for a vehicle comprising:
an air-cooled coolant radiator to cool a coolant flow of the vehicle, the radiator including a plurality of coolant tubes to direct the coolant flow through the radiator, and spaces between the coolant tubes to direct a cooling air flow through the radiator;
an air-cooled gas cooler to cool a gas flow of a $CO_2$ type air condition system of the vehicle, the gas cooler including an inlet manifold; and
an inlet gas conduit connected to the inlet manifold to direct the gas flow thereto, the inlet gas conduit positioned downstream of the radiator in the cooling air flow direction to be cooled by the cooling air flow exiting the radiator.

11. The cooling system of claim 10 wherein the gas cooler further comprises at least one air-side fin on the inlet gas conduit.

12. A cooling system for a vehicle comprising:
an air-cooled coolant radiator to cool a coolant flow of the vehicle, the radiator including a coolant collecting tank;
an air-cooled gas cooler to cool a gas flow of a $CO_2$ type air condition system of the vehicle, the gas cooler including an inlet manifold; and
a heat exchange connected to the inlet manifold to direct the gas flow thereto, the heat exchanger located in the coolant collecting tank to be cooled by the coolant flow.

13. A cooling system for a vehicle comprising:
an expansion vessel for a coolant system of the vehicle;
an air-cooled coolant radiator for the coolant system of the vehicle;
an air-cooled gas cooler to cool a gas flow of a $CO_2$ type air condition system of the vehicle, the gas cooler including an inlet manifold; and
a heat exchange connected to the inlet manifold to direct the gas flow thereto, the heat exchanger located in the expansion vessel to be cooled by coolant in the expansion vessel.

14. A cooling system for a vehicle comprising:
an air-cooled coolant radiator to cool a coolant flow of the vehicle, the radiator including a plurality of coolant tubes to direct the coolant flow through the radiator, and spaces between he coolant tubes to direct a cooling air flow through the radiator; and an air-cooled gas cooler to cool a gas flow of a $CO_2$ type air condition system of the vehicle, the gas cooler positioned upstream in a cooling air flow direction with respect to the radiator, the gas cooler including an inlet manifold and at least one tube; at least a portion of the at least one tube extending along and in heat-conducting contact with at least one of the coolant tubes of the radiator.

15. The cooling system of claim 14 further comprising an air-side fin contacting both the portion of the at least one tube and the at least one of the coolant tubes of the radiator.

16. A method of cooling a gas flow of a $CO_2$ type air conditioning system in a vehicle including an air-cooled gas cooler to cool the gas flow and an air-cooled coolant radiator to cool a coolant flow of the vehicle by transferring heat to a cooling air flow passing through the radiator, the method comprising the steps of:

pre-cooling the gas flow by transferring heat to the cool-ant flow; and after the pre-cooling step, cooling the gas flow in the gas cooler by transferring heat from the gas flow to the cooling air flow.

\* \* \* \* \*